INVENTORS
ELMER D. MANNHERZ
BY Roy F. SCHMOOCK

ATTORNEY

3,380,301
MAGNETIC FLOWMETER FOR MAGNETIC SLURRIES

Elmer D. Mannherz, Southampton, and Roy F. Schmoock, Ivyland, Pa., assignors to Fischer & Porter Co., Warminster, Pa., a corporation of Pennsylvania
Continuation-in-part of application Ser. No. 350,488, Mar. 9, 1964. This application May 4, 1966, Ser. No. 547,671
8 Claims. (Cl. 73—194)

ABSTRACT OF THE DISCLOSURE

A magnetic flowmeter to measure the flow velocity of magnetic slurries, such as those involved in the processing of magnetic iron ore, the flowmeter comprising an electromagnet to establish a magnetic field across a conduit through which the slurry flows, electrodes being disposed in a line extending perpendicularly with respect to this field to intercept signals generated by the flow of slurry through the conduit, a reference coil being located in a portion of the magnetic field to have induced therein a reference voltage proportional to the flux through the conduit, the relationship between the reference voltage and the signals being determined in order to indicate the flow velocity of the slurry.

---

Figure 1:
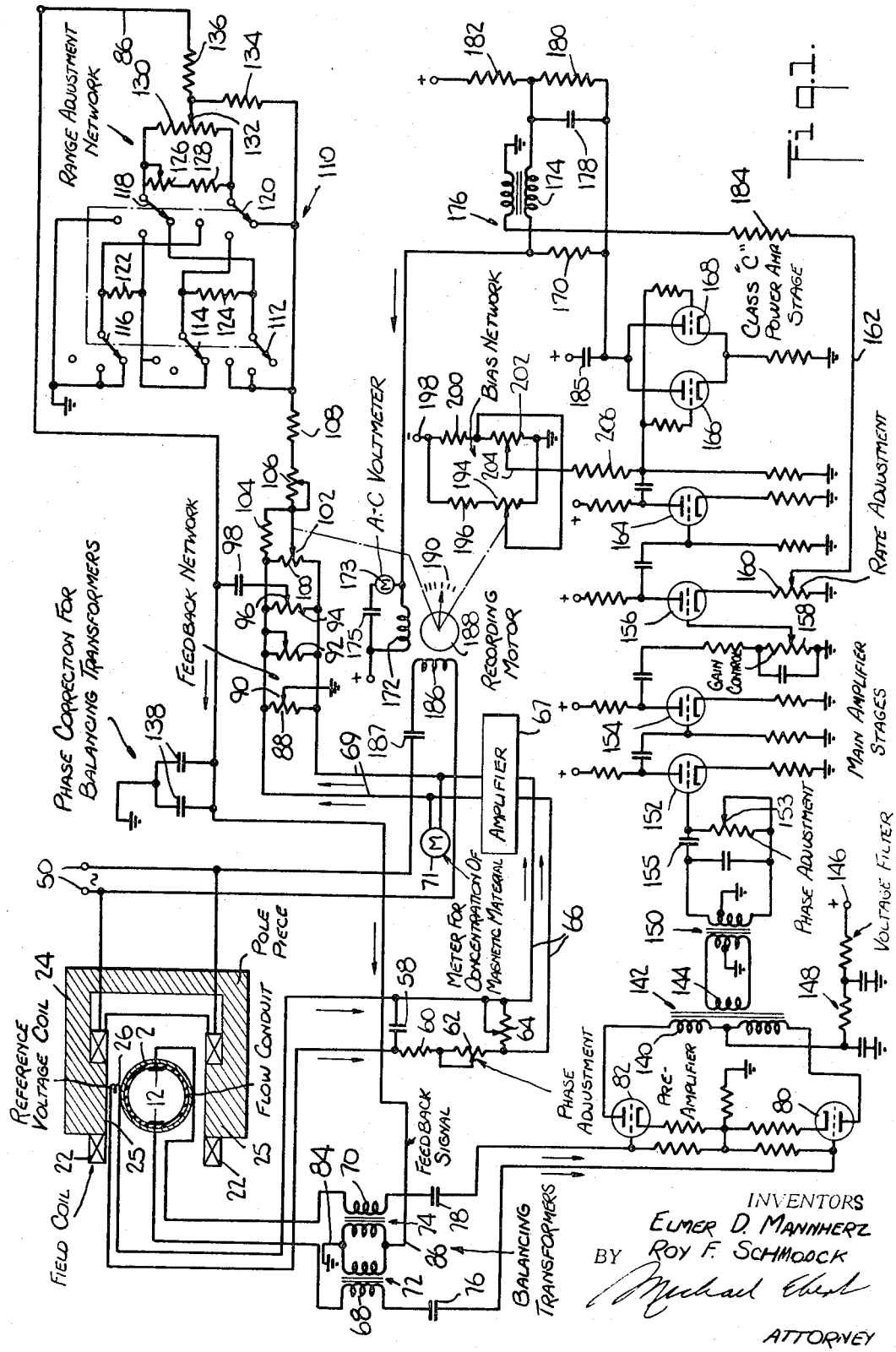

This invention relates to magnetic flowmeters for measurement of flow of magnetic slurries such as those involved in the processing of magnetic iron ores, for example those of the taconite formations of the Mesabi range. The invention is applicable to magnetic slurries generally and is also concerned with the measurement of the concentration of magnetic material in such a slurry. This application is a continuation-in-part of the copending application entitled "Magnetic Flowmeter," Ser. No. 350,488, filed Mar. 9, 1964, now abandoned.

Conventional magnetic flowmeters are not suitable for measuring the flow of magnetic slurries. Typically, as used for the measurement of what are from the practical standpoint non-magnetic fluids, such a flowmeter involves an exciting coil wound on a core structure providing magnetic flux transverse to a conduit through which liquid flow is occurring and has a reference voltage provided either by a transformer having its primary connected in series with the exciting coil or by a coil wound on the same core as the exciting coil and threaded essentially by the total flux through the core.

When the liquid is substantially non-magnetic, either such source of reference voltage is thoroughly satisfactory for comparison with the potential provided at the pickup electrodes. These electrodes are usually arranged on a line mutually transverse to the directions of the magnetic field through the flow conduit and the liquid flow. In each case the reference voltage is proportional to the magnetic flux, the geometric pattern of which is essentially the same for all flow rates of all non-magnetic liquids. Desirably, the magnetic field throughout the cross-section of the conduit is uniform, and to achieve this a configuration is used in which only a part of the flux threads the conduit, substantial other parts thereof passing outside the conduit. Since the effective reluctance of the conduit and the liquid therein is approximately that of air, the geometry of the magnetic field remains constant under all conditions of operation.

But when the flowing fluid consisting of the liquid whose suspended content of solid magnetic material is highly magnetic and of varying composition, such references are unusable. The presence of the flowing magnetic material lowers very considerably the reluctance of the gap through which flow occurs between the pole faces of the core structure, so that the geometry of the magnetic field changes considerably with the concentration of the magnetic material and the ratio of the flux density threading the conduit to the exciting current changes correspondingly. In other words, the flux density threading the liquid, and which is responsible for the ouput signals, is no longer proportional either to the current through the exciting soil or to the total flux which threads the core.

Accordingly, it is the main object of this invention to achieve satisfactory metering of a magnetic slurry by deriving a reference voltage from a coil so positioned and dimensioned as to be threaded only by a portion of the flux which threads the conduit through which the slurry flows, so as to be proportional to that part of the total flux which is responsible for production of the output potential at the electrodes. Thus the effects of changes in the geometric configuration of the magnetic field due to changes in the reluctance of the fluid are minimized.

Also an object of this invention is to measure the concentration of the magnetic slurry. The reference voltage itself is a function of the change of reluctance and, therefore, of the concentration of the magnetic material in the fluid independent of velocity, so that the reference voltage may be used as a measure of this concentration. The functional relationship between reference voltage and concentration of magnetic material is obtained by calibration.

It is somewhat complex in its derivation. For a given supply voltage to the exciting coil, the decrease in reluctance across the gap due to increase in amount of magnetic material therein produces an increase in self-inductance of the coil, and, accordingly, less exciting current flow; but the decreased reluctance increases the proportion of the total flux which threads the conduit, and accordingly increases the flux through the reference coil so that the reference voltage will increase with increase in concentration of the magnetic material.

Still another object of the invention is to provide a flowmeter of the above type for measuring magnetic slurries with a high degree of accuracy, the meter being substantially insensitive to changes in temperature.

Figure 2:
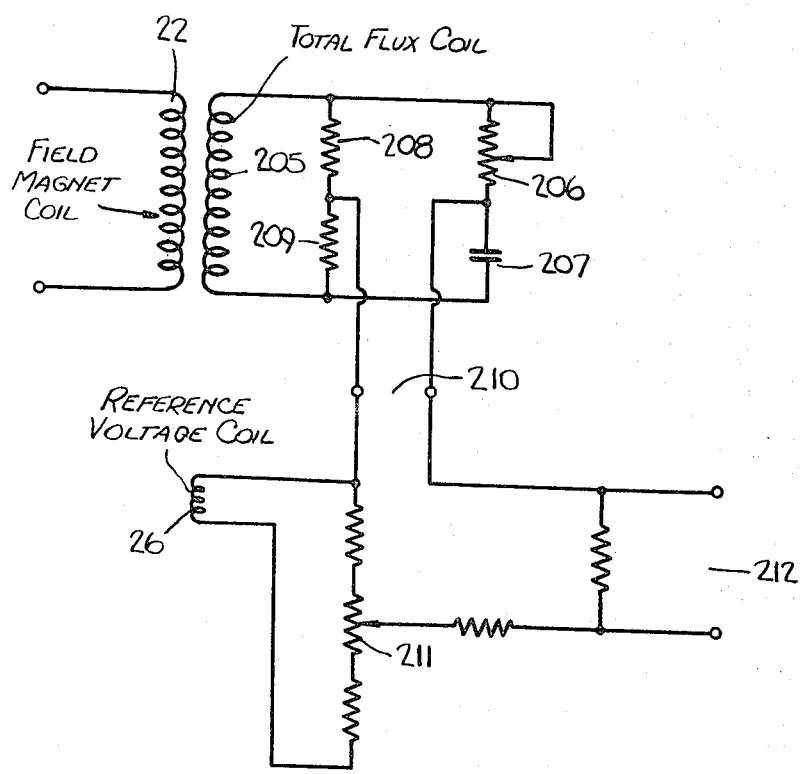

For a better understanding of the invention, as well as other objects and further features thereof, reference is made to the following detailed description to be read in conjunction with the accompanying drawing, wherein:

FIG. 1 is a diagrammatic showing of the structural and electrical components of a flowmeter for measuring magnetic slurries, in accordance with the invention, and FIG. 2 is another embodiment of a flowmeter in accordance with the invention, which is insensitive to changes in temperature, only that portion of the system being shown which is at variance with the system shown in FIG. 1.

The structure and circuit of the flowmeter

The flowmeter is similar in many respects to that shown in Kass Patent 3,094,000 dated June 18, 1963 and it comprises primary and secondary units. Reference may be made to the Kass patent for structural aspects and also the electrical elements and their operations which are not specially changed in accordance with the present invention. However, the flowmeter shown in the Kass patent is of the type used for the measurement of flow of non-magnetic fluids.

Refering now to FIG. 1, the meter comprises a tube 2 for carrying the magnetic slurry being measured. This tube 2 may be of metal, such as stainless steel, lined with an insulator such as neoprene, or it may be formed of an insulating plastic. At diametrically opposite points in the tube 2, inwardly extending electrodes 12 are provided, which are exposed to the liquid. The electrodes are insulated from the wall of the tube if this is conductive.

A magnetic field of uniform type is established which extends at right angles to the diameter forming the common axis of the electrodes 12 and to the tube axis, this field being produced by a pair of coils 22, preferably of the form described in said Kass patent. A magnetic core 24 is associated with these coils and presents pole faces 25 to the conduit.

As is usual, the entire flux between pole faces 25 does not thread the conduit. This situation is intentionally adopted in order that the magnetic field throughout the cross-section of the conduit will be essentially uniform, which would not be the case if the fringe flux lines passed through the conduit. It is for the reasons just indicated that variation of reluctance of the material within the conduit will produce change of distribution of the flux, particularly as between that which threads the conduit and that which does not. However, the flux distribution through the conduit itself will remain substantially uniform, though its intensity will vary.

For the purpose of providing the reference voltage, a coil 26 is provided with its axis located centrally of the magnetic field and the conduit. This coil may be provided above or below the conduit as indicated. It may have any suitable number of turns, but its diameter is desirably limited so that it will be threaded only by a portion of the flux passing through the conduit. This is in order to have it threaded solely by the uniform flux passing through the conduit and not by any fringe flux which may vary in configuration in dependence upon the reluctance of the mixture undergoing measurement. The dimensions are, of course, not critical, but desirably the coil does not have a diameter substantially exceeding about ⅓ the diameter of the conduit and it may be much smaller than this. Considering placement along the axis of the conduit, it should be in the central portion of the extent of the field.

Alternating current is supplied from the terminals 50 connected to the usual power supply, for example 110 volts at 60 cycles. FIG. 1 also shows various direct current supply terminals and it will be understood that these are fed by conventional direct power supplies energized from the commercial alternating supply.

The magnetic field windings 22 are connected in series or parallel and to the supply terminals 50. The coil 26 is connected to a network comprising the capacitor 58 connected across the coil and the parallel resistance arrangement comprising in series the fixed and adjustable resistors 60 and 62 and the adjustable resistor 64, to the terminals of the latter there being connected the leads 66. The leads 66 feed an amplifier 67 to raise the signal applied thereto to a suitable level, the output leads from this amplifier being shown at 69.

Amplification in this fashion is not required in accordance with the disclosure of the Kass patent since the reference voltage may be derived from a transformer connected in the supply lines to the field coils. In the present case, however, the coil 26 is in a magnetic circuit which has a considerable gap so that, unless a great many turns are used the induced voltage will be low and there will not be good matching to the remaining parts of the circuit. The amplifier 67 therefore provides both amplification and proper matching of impedances.

A meter 71 connected across the lines 69 is used for measurement of the concentration of magnetic material in the flow. This meter may, of course, be of indicating or recording type.

While the elements of the network are interdependent, the adjustment of resistor 62 primarily affords phase adjustment while that of resistor 64 affords amplitude adjustment. These afford corrections for eddy current shifts. The result of the adjustments is to provide a constant ratio between the potential per unit velocity appearing at the electrodes and the current which is provided at the conductors 66. The ultimate result is that the response of the secondary unit is full scale in terms of feet per second of liquid flow velocity for any primary unit which may be associated with a secondary unit.

The leads from electrodes 12 are connected individually through the secondaries 68 and 70 of identical transformers 72 and 74, and through capacitors 76 and 78 to the grids of triodes 80 and 82. The primaries of the transformers 72 and 74 are connected in parallel between ground at 84 and a line 86 in such fashion that signals fed back through the line 86 will null the signals from the electrodes, the connections being such that opposition to the electrode potential is provided by each transformer. The symmetrical arrangement here adopted involves rejection of signals which may flow in the same direction through the symmetrical connections.

The feedback signal flowing through line 86 is derived from a network receiving its input from lines 69. A potentiometer 88 connected between these lines has its adjustable contact 90 grounded. A second potentiometer 92 is connected between these lines to provide a variable resistance. A third potentiometer 94 connected between these lines has its adjustable contact 96 connected through capacitor 98 to the connection 86. A fourth potentiometer 100 connected between lines 69 is arranged, as illustrated, with its variable contact 102 connected to one of the lines through a resistor 104 and through a variable resistor 106 and a fixed resistor 108 to the range adjustment network, generally indicated at 110.

This network comprises a group of ganged switches 112, 114, 116, 118 and 120, connected as illustrated between the resistor 108 and ground in conjunction with the equal resistors 122 and 124 having fixed values. The series arrangement of fixed resistor 128 and adjustable resistor 126, and the potentiometer 130, the adjustable contact 132 of which is connected through resistor 134 to the resistor 108 and through resistor 136 to the connection 86, provides an output to the connection 86. A pair of small capacitances are connected in parallel between the connection 86 and ground. As will more fully appear, the potentiometer contact 102 is adjusted by a reversible motor 188. The functions of the various parts of the network just described are as follows:

Potentiometer 88 serves as an electrical centering control to set zero flow at any desired position on the recording chart of the meter. This makes it possible to indicate the measure bidirectional flow where that is required. The nature of this action will be evident upon considering the ground connections of contact 90 and, at 84, the ground connection of the primaries of transformers 72 and 74.

Adjustable resistance 92 acts to set the input resistance of the balancing network. This input resistance is desirably of low value, typically, for example, about 81 ohms, and by the use of the adjustment under discussion the input resistance may be set to such a value that various secondary units may be made interchangeable.

Potentiometer 94 and its connection through capacitor 98 provides a null control allowing an operator to null out unwanted signals which are in quadrature with the error signal and aids in phasing the servo amplifier precisely, with greater accuracy than is attained by using an oscilloscope. The proper phase of quadrature signal is obtained by use of the capacitor 98 and reactance of which is many times that of the total network. A phase shift obtained from this capacitor is very nearly 90° and the shift gives essentially a true quadrature signal.

Balancing is effected by the motor controlled movements of the contact 102 of potentiometer 100 associated with the fixed resistor 104 which compensates for the load on the potentiometer 100 caused by the range adjustment network, and with the adjustable resistance 106 which compensates for the loading of the range network by the input impedance of the balanced transformers 72 and 74.

The balance signal is fed and attenuated through the range adjusting network 110 so that full scale sensitivity is accurately known. Adjustable resistor 126 serves for trimming. The range potentiometer 130 is desirably of multi-turn type and constitutes in conjunction with resistors 122 and 124 a voltage divider network. With resistors 122 and 124 equal (for example, having values of 450 ohms each) and with the parallel arrangement of potentiometer 130 and the adjustable and fixed resistors in parallel therewith providing an effective resistance of the same value (potentiometer 130 having, for example, a resistance of 500 ohms), the switching arrangement is such as to locate the potentiometer in any one of three alternate positions in a series arrangement including it and the resistors 122 and 124. Thus, considering an arbitrary over-all range of 0 to 30, the placement of the potentiometer resistance may be in a range 0 to 10, 10 to 20, 20 to 30, depending on the position of the switches, so that full range adjustment of the potentiometer may occur throughout any of these ranges.

The inductive reactance of balancing transformers 72 and 74 causes a phase shift of the balancing signal which must be corrected, and this correction is obtained through the use of capacitors 138 which may be chosen to suit particular units since the necessary correction varies from unit to unit. Through the use of standard capacitors, one being relatively large and the other being small to act as a trimmer, it is unnecessary to provide an adjustable capacitor for this phase correction.

If it were assumed that there was an indicator of the potential difference between the grids of triodes 80 and 82, and if adjustment of the contact 102 of potentiometer 100 was made to provide a zero potential difference at these grids, i.e., a null, it will be evident that the setting of the potentiometer contact would be a measure of the liquid flow. The manner in which automatic adjustment is achieved to secure a null will now be described.

Triodes 80 and 82 and their associated circuits constitute a preamplifier for the net output from the secondaries of transformers 72 and 74 and the electrodes 12. In this connection it may be noted that these transformers are preferably located in the primary unit assembly to reduce the effect of cable capacitance as a shunt of signals which originate in high resistance liquid. In such case, capacitors 138 should also be in the primary unit, for they correct for the phase shift due to the inductive reactance of the transformers. A cable connection may thus either precede or follow these transformer secondaries for their connection to the remaining portions of the circuit.

The preamplifier primarily affords an impedance matching device and transformation from a balance to-unbalance arrangement. The triodes are connected in push-pull arrangement to the primary windings 140 of a transformer 142, the secondary 144 of which feeds amplified signals through a transformer 150 to the first stage triode 152 of the main amplifier. Special filtering is provided by network 148 for the positive supply provided to the triodes 80 and 82 from a positive supply terminal 146 of the power supply.

The main amplifier includes the triodes 152, 154, 156 and 164 in generally conventional cascade stage form. Phase shift adjustment is effected by variation of contact 153 of potentiometer 151, providing a variable resistance associated with capacitor 155, gain control being provided by potentiometer 158. In order to avoid hum it is desirable to provide to the heaters of triodes 80, 82, 152 and 154 suitable direct current which may be derived from the supply through a suitable rectifier and simple filter system, not shown. Rate feedback control is provided at the potentiometer 160 in the cathode-to-ground return of triode 156.

In order to provide sufficient motor driving power, a pair of triodes 166 and 168 in parallel arrangement provide a power amplifier. Their output is fed through resistor 170 to the field winding 172 of motor 188. The other phase winding 186 of this motor is provided with reference current from the terminals 56 through capacitor 187. It will be understood that the motor is of a type which reverses in accordance with the phase relationship of the currents through its windings 172 and 186, remaining stationary when the current in winding 172 is in quadrature with that properly produced therein by desired signals picked up by electrodes 12. Shunted across field winding 172 is the series arrangement of an alternating current voltmeter 173 and a capacitor 175.

The primary 174 of a transformer 176 is connected between the signal output side of resistor 170 and the parallel arrangement of resistor 180 and capacitor 178, the right-hand end of the transformer primary 174 being connected through resistor 182 to a positive supply terminal which may be the same terminal as that to which the winding 172 is connected. The secondary of the transformer 176 provides a signal between ground and the adjustable contact of the rate adjustment potentiometer 160, the connection being through resistor 184 and lead 162. This rate feedback control has its usual functions.

In a flowmeter of this type hydraulic "noise" may cause rapid excursions of a recording pen producing a broad line on the chart and this is undesirable. Heretofore, these excursions have been damped out by the use of dashpots, but they, in turn, greatly slow down the response. In the present system provision is made electrically for an action which corresponds, roughly, to the use of backlash in mechanical gearing but with provision for proper adjustment. In brief, this is accomplished by operating the final amplifier stage comprising the triodes 166 and 168 under class C conditions thereby limiting the response to large signal excursions only, in excess of those which would be due to "noise."

To secure this result, variable bias is applied to the grids of triodes 166 and 168. A contact 192 of potentiometer 194 is driven by motor 188 to effect automatic adjustment. Potentiometer 194 is connected in series with a resistor 196 between ground and a negative bias supply terminal 198 of the power supply. Also between this terminal 198 and ground are resistor 200 and potentiometer 202, the adjustable contact 204 of which is connected through resistor 206 to the grids of the final stage triodes 166 and 168. The potentiometer contact 192 is joined to the junction of resistor 200 and potentiometer 202. The network just described is provided because hydraulic noise is not precisely proportional to flow rate.

Resistance network comprising 194, 196 and 200 provides an output voltage across potentiometer 202 so that the smoothing control thus constituted has the desired voltage characteristic. Potentiometer 202 has a high resistance as compared with the other resistances in this smoothing network and consequently does not alter the characteristic of the output voltage but is a manually adjustable amplitude control used only to limit the bias voltage as dictated by the hydraulic noise of the system. The ganging of contact 192 with contact 102 determines the relative amount of smoothing voltage applied as a bias to the amplifier stage.

Because of the application of the negative bias varied in accordance with desired operation, the last amplifier stage operates under class C conditions so that signal excursions less than a predetermined amplitude do not produce motor-driving output. The amount of the bias determines the minimum signals received from triode stage 164 which will produce motor drive. The amount of this minimum may be manually adjusted through potentiometer contact 204, while the amount is also automatically adjusted by the operation of motor 188 the range of the "dead" region within which the drive will not be effected varying with the flow rate as reflected by the position of the motor 188. In general, the range of this dead region is desirably greater for larger flow rates than for smaller flow rates. Further, it is desirable for the width of the dead region to become esssentially zero, as a result of operation of contact 192, when the flow is somewhat greater than zero, to assure a live zero, and the constants of the circuit are chosen accordingly.

While element 188 has been generally referred to as a motor, it will be understood that in practice this may be a conventional phase-sensitive recorder motor driving through reduction gearing, the potentiometer contacts 102 and 192 and either an indicator or a marking pen cooperating with either a fixed or time driven chart scale indicated at 199. In conventional fashion this may also operate controls related to the flow, e.g., to maintain the flow constant, to effect other operations in accordance with the flow, or the like.

The operation of the flowmeter

The overall operation of the flowmeter illustrated in FIG. 1 may now be briefly outlined as follows:

For a given rate of flow through tube 2, there will be produced an output voltage across electrodes 12 the magnitude of which is proportional to the flow rate for a given magnetic field strength threading the conduit and produced by windings 22. Prior to balance, corresponding signals are applied to the amplifier system to furnish current to motor winding 172 which will drive motor 188 and with it the potentiometer contact 102 to provide a feedback signal to balance the electrode signal to supply a zero input to the amplifier. In case of a voltage change at terminals 50 affecting the strength of the magnetic field, a corresponding change in output from transformer 54 occurs so as to balance out effectively such variations. Adjustments which have already been described take care of quadrature potentials which enter into the system.

The foregoing assumes error signals of sufficient magnitude to drive motor 188. The smoothing arrangement, providing bias to the last stage of the amplifier, prevents such movements when the error signals due to noise fluctuations are insufficient to provide output from the class C amplifier stage. Despite the fact that small fluctuations will not give rise to response of the motor, it should be noted that class C operation referred to does not involve any deterioration of response to signals exceeding those which are to be effectively suppressed. Thus there is no loss in rapidity of response to desired signals.

The use of meter 173 for the adjustment may now be described. Potentiometer 94 serves to introduce a quadrature signal to the line 86. The introduction of a quadrature potential amplified and delivered to motor winding 172 (as well as to the voltmeter 173) should produce no rotation of the motor, i.e., no change in flow indication, if the correct phase relation between the amplifier input and the motor field current exists.

A test for proper amplifier phase adjustment may be made by manually moving potentiometer contact 96 in both directions so that voltmeter 173 reveals amplifier quadrature signals. As a result of such signal changes there should be no change in flow indication. If such change occurs, it is necessary to adjust the phase of the amplifier output by change of the setting of contact 153 of potentiometer 151.

It will be apparent that when the quadrature signal, which is always at 90° with respect to the flow signal, produces no deflection of the flow indicator, the phase relationship between the amplifier input and the servomotor field will be that for maximum sensitivity of the flow signal and for optimum rejection of any spurious quadrature signal that may arise in the flow detector. When the phase of the amplifier has been properly adjusted by contact 153 so that movement of potentiometer contact 96 and correspondingly large variations in readings on meter 173 are no longer accompanied by changes in flow indication, contact 96 is then adjusted to give the minimum achievable reading on meter 173, the significance of which minimum reading would be that minimum quadrature signals were being introduced to the amplifier.

Small phase drifts with time in the amplifier can then produce no significant error in flow indication in the absence of substantial quadrature signals. Conversely, if, as would be unlikely, a spurious quadrature signal appeared over a long time period, no error of flow indication would result so long as the phase situation remained satisfactory. Only in the event of the extremely unlikely simultaneous occurrence of a large spurious quadrature signal and of a considerable amplifier phase drift would there occur an error in flow indication, and a large reading on the meter 173 would make this situation immediately obvious.

It is also to be noted that lines 69 receive from coil 26 an alternating signal which may be considered the in-phase signal, preliminary adjustments having been made to achieve this condition as closely as possible with respect to the electrode signals. Starting, therefore, with the signal across lines 69, an alternating signal through the feedback network running from 88 through 108 and from 108 through range adjustment network 110 to line 86 is provided, delivered to the primaries of the transformers 72 and 74.

Noting that only resistances are involved in this path (neglecting the high reactance at 98) the signal is an in-phase one. Across the resistance of potentiometer 94 there is, then, an in-phase potential with respect to ground represented by the contact 90 of potentiometer 88. Accordingly, an in-phase potential appears at contact 96. As previously pointed out, the reactance of capacitor 98 is many times that of the total resistances involved in the network. Therefore, the current through 96 is 90° out of phase, so that the signal component thus provided through capacitor 98 to the primaries of the transformers 72 and 74 is a quadrature one. The magnitude of this signal may be varied by movement of contact 96.

The foregoing explains the quadrature input to line 86. If it were not for the slight corrections between the secondary 56 of transformer 54 and the lines 69, the quadrature potential could be applied to the line 86 directly from the supply terminals 50, utilizing a high reactance capacitor. However, it is desirable to use as the source for this quadrature signal a portion of the system which carries an in-phase signal already corrected.

In contradistinction from what is disclosed in the Kass patent, it will now be evident that the reference voltage is derived from the coil 26 and is a measure solely of the flux which passes through the conduit and is not a measure of either the current to the exciting windings 22, nor the total flux passing through the core only some of which threads the conduit. In this regard it may be informative to cite typical figures obtained, utilizing the flowmeter as just described.

With water flowing through the meter with no content of magnetic material, the magnet current, through the windings 22, was 1.37 amperes and the reference voltage appearing across lines 69 was 4.23 volts. The ratio of signal voltage overflow rate was found to be 1.835 millivolts per gallon per minute. This gave a signal voltage per flow rate per reference voltage equal to 0.434.

In contrast, when there was flowing a slurry containing 32.5 of magnetite by weight, the magnet current dropped to 1.27 amperes while the reference voltage across lines 69 rose to 4.95 volts. The ratio of signal voltage over flow rate was then 2.175 millivolts per gallon per minute. The signal voltage per flow rate per reference voltage was 0.439.

From the foregoing it will be seen that the signal voltage per flow rate per reference voltage remained very nearly constant with an error of only 1.24 which figure represents a quite satisfactory measure of independence of the flow measurement with respect to the contents of magnetic material. The drop of magnet current with the presence of magnetic material indicates the change of inductance produced by the low reluctance of the magnetic path. The increase in reference voltage, on the other hand is indicative of the major change of geometry of the flux, indicating the greater threading of the conduit by the field.

The change of reference voltage may be used as a measure of the concentration of magnetic material in the flowing liquid, meter 71 serving for this measurement. As pointed out previously, because the change in reference voltage with respect to concentration of magnetic material is derived from a rather complex set of circumstances, the practical aspects of this measurement involve calibration of the flowmeter using known concentrations of the magnetic material. Such calibration may be readily made and the results are substantially independent of adjustments which may be made in, or operations of, the flow measuring portions of the circuit. It need only be insured that the commercial supply voltage is reasonably constant.

*Temperature compensated flowmeter*

A system of the type disclosed in FIG. 1 has some degree of sensitivity to variations in temperature, and where the system is installed in an environment subject to large temperature changes, it is desirable that the system be rendered substantially insensitive to such changes.

In the system shown in FIG. 1, the output of the reference voltage coil 26, which lies in the air gap, is a function both of the level of the flux density and the distribution of flux in the vicinity of the coil. In a system in which the reference is derived from the line voltage, any change of copper resistance, eddy current losses, or inductance of the coils, due to geometry variations of iron permeability variations, will affect the relationship between the total flux and line voltage and therefore cause a change in indication. These factors are all subject to variation with changes in temperature. A similar situation exists when using a current-derived reference, except that the effects due to copper resistance changes are obviated.

In order, therefore, to render the system insensitive to temperature variations, it is essential that the reference signal be derived directly from the total flux rather than to infer a function of total flux density level from some other parameter. In this way, output variations due to changes in eddy current losses and other factors mentioned above, may be eliminated or minimized.

To accomplish this purpose, a coil 205, hereinafter referred to as a total flux coil, is wound about the outside diameter of one of the two field magnet coils 22. In practice, the coil may consist of nine turns wound around the outside diameter of one of the magnet coils and taped rigidly thereto. The output of the total flux coil 205 is phase-shifted by a network including variable resistor 206 in series with capacitor 207. The output of the network is derived from the junction of the resistance-capacitance circuit and the junction of two series-connected resistors 208 and 209, shunted across the total flux coil. This output, which is a correction voltage, appears across terminals 210 and is applied in series with the reference voltage output of the coil 26, the latter being attenuated by a resistance network including potentiometer 211. The corrected or net reference output is available at terminals 212, and is fed to amplifier 67 and thereafter processed in the manner described in FIG. 1 with the reference voltage.

The output of total flux coil 205 is phase-shifted and attenuated relative to the output of reference voltage coil 26 so that with no magnetite or other magnetic material present in the flowmeter conduit, its output is equal and opposite to the signal from the reference voltage coil. Any change in total flux will affect both coils in the same manner, hence the net output signal, which is zero without magnetite, does not change. With magnetite present in the meter, no change results in the total flux, but a change takes place in the direction of the flux in the air gap. This change in direction gives rise to a change in the output from the reference voltage coil in the air gap, and therefore the net signal from the two coils, this net signal being a function of the percentage of magnetite.

Inasmuch as total flux coil 205 has an output which in practice is lower than that from reference voltage coil 26, it is the reference coil signal which is attenuated rather than the total flux coil signal to attain zero output in the absence of magnetite. A further attenuation of the net signal is generally necessary to prevent the signal with magnetite present from exceeding the range of the secondary.

It has been found that when using a system of the type disclosed in FIG. 1, the temperature effect was as high as 1% per 10° F. change in temperature, whereas when the system was modified in the manner disclosed in connection with FIG. 2, the temperature effect for the same 10° F. change was .04% magnetite shift. In both instances, a three-inch magnetite primary was used and a known amount of magnetite, only the primary of the flowmeter being subjected to varying temperature in the range of 90° F. to 150° F. Thus a 25-to-1 improvement was attained.

While there has been shown and described preferred embodiments of my invention, it will be appreciated that many changes and modifications may be made therein without, however, departing from the essential spirit of the invention as defined in the annexed claims.

What I claim is:
1. A magnetic flowmeter comprising,
   (a) a conduit for flowing a magnetic slurry,
   (b) electromagnetic means establishing a magnetic field extending transversely through said conduit, said means including pole faces which are presented to said conduit and extend therebeyond to produce flux lines which are substantially uniform throughout the cross-section of said conduit, the fringes of said flux lines being outside of said conduit,
   (c) electrodes exposed to said magnetic slurry flowing through the conduit and disposed in a line extending perpendicularly with respect to said magnetic field to intercept signals generated by the flow of slurry therethrough, and
   (d) a reference coil located in and threaded by a portion of said field, said coil being restricted to a portion of said field which passes wholly through said conduit and having induced there in a reference voltage proportional to the flux through the conduit, and means to determine the relationship of said reference voltage to said signals to produce an indication of the flow velocity of said magnetic slurry.

2. A magnetic flowmeter, as set forth in claim 1, wherein said last-named means includes means responsive to said reference voltage to provide a voltage bucking said signals, and means providing an indication of the relationship of the bucking voltage and said signals.

3. A magnetic flowmeter, as set forth in claim 1, further including means to measure said reference voltage to afford an indication of the concentration of the magnetic material in said slurry.

4. A magnetic flowmeter, as set forth in claim 1, further including means supplying an alternating current to said electromagnetic means.

5. A magnetic flowmeter, as set forth in claim 1, further including a coil surrounding said electromagnetic means to produce a correction voltage representing total flux, and means to apply said correction voltage in series with the reference voltage to produce a net reference voltage to compensate for temperature variations.

6. A magnetic flowmeter comprising,
   (a) a conduit for flowing a magnetic slurry,
   (b) an electromagnetic coil disposed with respect to said conduit to establish therein a magnetic field extending transversely therethrough, (c) electrodes exposed to said magnetic slurry flowing through the conduit and disposed on a line extending perpendicularly with respect to said field to intercept signals generated by the flow of slurry therethrough, (d) a reference coil located in and threaded by a portion of said field, said coil being restricted to a portion of said field which passes wholly through said conduit and having induced therein a reference voltage proportional to the flux through said conduit, (e) means responsive to said reference voltage to produce a voltage bucking said signals, (f) means providing an indication of the relationship of said bucking voltage and said signals to indicate flow velocity, and (g) means to measure said reference voltage to indicate the concentration of magnetic material in said slurry.

7. A flowmeter as set forth in claim 6, further including a total flux coil surrounding said electromagnet means to produce a correction voltage representative of total flux, and means to apply said correction voltage in series with said reference voltage to produce a net reference voltage to compensate for temperature variations.

8. A flowmeter as set forth in claim 7, further including a phase-shifting and attenuating network coupled to said total flux coil to adjust the level of said correction voltage relative to the level of said reference voltage to produce a net reference voltage which is zero in the absence of magnetic material in said conduit.

References Cited

FOREIGN PATENTS 834,011    5/1960    Great Britain.

JAMES J. GILL, *Primary Examiner.*

C. A. RUEHL, *Assistant Examiner.*